INVENTORS
MARIO V. MASCIOLI &
ANTHONY T. BUONO
BY
Brown, Denk & Lynnestvedt
AGENTS Patented Mar. 22, 1949

2,465,107

UNITED STATES PATENT OFFICE 2,465,107

REFRIGERATOR, INCLUDING A FROZEN FOOD THAWING APPARATUS

Mario V. Mascioli and Anthony T. Buono, Philadelphia, Pa., assignors to Philco Corporation, Philadelphia, Pa., a corporation of Pennsylvania Application September 6, 1946, Serial No. 695,154

2 Claims. (Cl. 62—89)

The present invention relates to refrigerating apparatus, and has for its primary object the provision of a household refrigerator adapted to thaw frozen foodstuffs in a rapid, efficient and economical manner.

It is an additional, more specific object of the present invention to provide a refrigerator including thawing apparatus of such a nature as to utilize heat rejected to the atmosphere by the condensing unit, thereby simultaneously to provide for cooling of said unit and thawing of the frozen substances.

To the foregoing general ends, the invention contemplates the provision of an enclosure located in the vicinity of a suitable source of heat such, for example, as the condensing unit, in novel combination with means adapted to promote a circulatory flow of air through said enclosure and in heat exchange relation with said source of heat. In the embodiment illustrated, the apparatus for promoting such circulatory flow comprises air-flow passages so disposed, with respect to both the condensing unit and the frozen substances, as to establish a thermo-syphon circulation of air through the enclosure and past the condensing unit.

Figure 1:
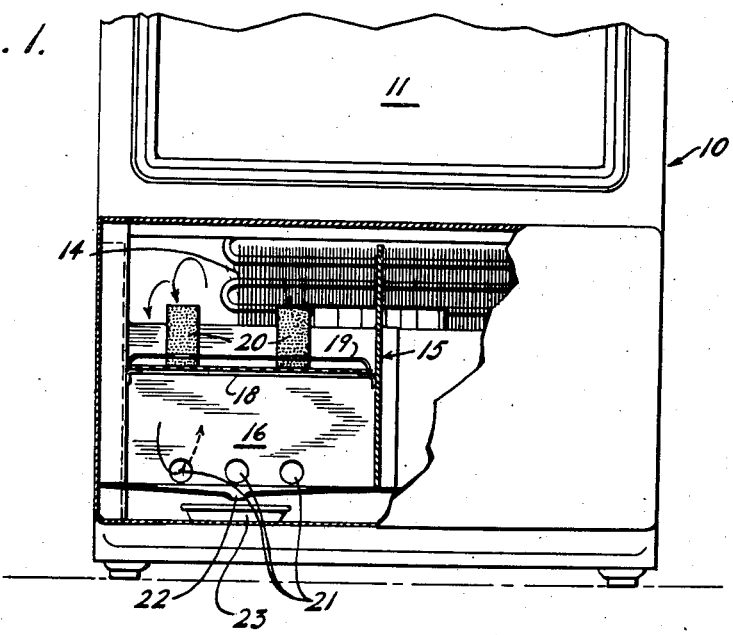
Figure 2:
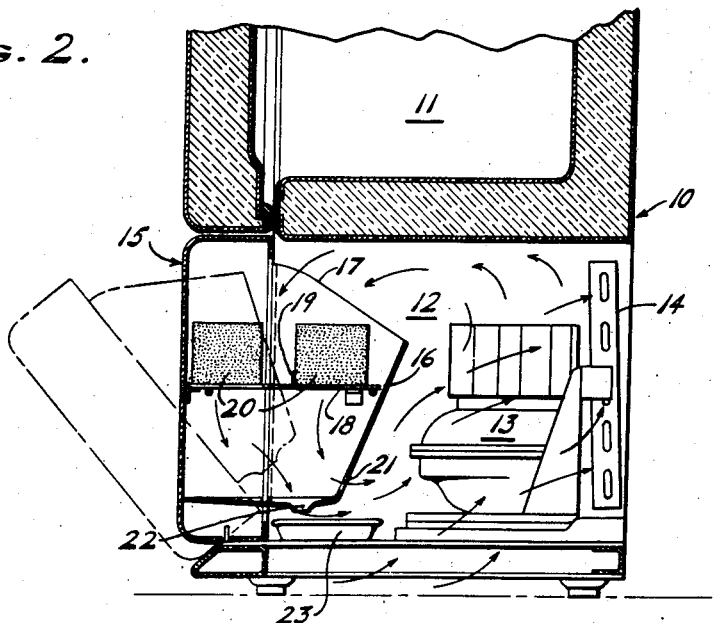

The manner in which the foregoing, together with other objects and advantages are achieved in one representative embodiment of the invention, will be best understood by reference to the following specification and to the accompanying drawing, in which:

Figure 1 is a fragmentary elevational view of a refrigerator incorporating the present invention, portions of the structure being broken away to facilitate illustration; and, Figure 2 is a cross-sectional view taken through the apparatus of Figure 1.

Making more detailed reference to the drawing, there is illustrated the lower portion of a household refrigerator indicated generally by the reference numeral 10, said refrigerator including an upper food storage compartment 11 and a lower machine compartment 12, housing the condensing unit which latter includes a motor-compressor shown at 13 and a condenser 14. For the purposes of the present invention, any suitable evaporator system may be utilized to effect cooling of the compartment 11, and such system need not be illustrated or described herein.

In the embodiment illustrated, the enclosure adapted to receive the frozen food takes the form of a bin, indicated at 15, which, as shown in broken lines in Figure 2, may be tilted forwardly to afford access thereto. This bin is provided with a rear wall 16 and lateral walls 17, the top of the enclosure being open, as clearly appears in Figure 1, to afford access of heated air to the interior of the bin across the top of the wall 16. Support structure, including a perforated shelf 18 and a vertical rack 19, is adapted to support packages of frozen food shown at 20, it being understood that such packages would be placed within the bin in spaced relation, to provide for free circulation of air therearound. Since this air is raised to a relatively elevated temperature by the heat rejected by the condensing unit, circulation of such air through the bin will effect rapid thawing of the frozen substances.

To effect such circulation, the rear wall 16 of the enclosure is apertured, as shown at 21, at a level below the level at which the packages 20 are supported. In operation of the apparatus, the ambient air within the machine compartment 12 is heated by the motor-compressor and the condenser, and as represented by the arrows appearing in the drawing, this heated air rises along the condenser, flows forwardly into the bin 15, and there gives up a portion of its heat to the packages 20. As a result of the cooling thus effected, the air then flows downwardly past the packages, and out through the apertures 21, to then be drawn upwardly again past the condenser 14. Thus, a thermo-syphon circulation of air is established within the compartment 12, such circulation serving not only to thaw the substances placed within the enclosure 15, but also to assist in the cooling of the condensing unit.

As shown in the drawing, provision is made to collect such moisture as may be given up by the thawing of the substances contained within the packages 20, this being accomplished by delivering the moisture to a drain aperture 22 from whence it flows into a container shown at 23. It will be recognized that the moisture so collected will be vaporized by the heat rejected by the condensing unit, thus obviating any problem of moisture disposal and further assisting in the maintenance of the thermal gradient required between the condenser and the ambient air.

While a representative embodiment of the invention has been described herein, and illustrated in the accompanying drawing, it is evident that changes and modifications may be made therein without departing from the spirit of the present invention. However, it will be recognized that such changes are contemplated as may come within the scope of the appended claims.

We claim:

1. In refrigeration apparatus, a machine compartment, a condensing unit disposed within said machine compartment and operative to reject heat to the air within the compartment, an open top bin-like receptacle normally disposed within said compartment in a position such that said air is afforded free access to said receptacle through the open top thereof, said receptacle being provided with an aperture in a lower portion of one wall thereof, said aperture providing for passage of air from the interior of said receptacle toward said condensing unit, and means within said receptacle adapted to support frozen substances in a position intermediate the open top of the receptacle and said aperture, the construction and arrangement being such that air heated by said condensing unit flows into said receptacle through the open top thereof, gives up a portion of its heat to the said frozen substances to thaw the same, and as a result of the cooling thus effected flows downwardly past the frozen substances and out through said aperture to be drawn upwardly again past the condensing unit.

2. Apparatus in accordance with claim 1, and further including means for collecting moisture resulting from the thawing process, said last means being disposed within the machine compartment in heat exchange relation with said condensing unit.

MARIO V. MASCIOLI.
ANTHONY T. BUONO.

REFERENCES CITED

The following references are of record in the file of this patent:

UNITED STATES PATENTS

| Number | Name | Date |
| --- | --- | --- |
| 2,304,411 | Keighly | Dec. 8, 1942 |
| 2,388,746 | Knapp | Nov. 13, 1945 |

FOREIGN PATENTS

| Number | Country | Date |
| --- | --- | --- |
| 507,135 | Germany | Sept. 12, 1930 |